United States Patent [19]
Kaiser et al.

[11] Patent Number: 5,763,042
[45] Date of Patent: Jun. 9, 1998

[54] REINFORCING STRUCTURAL REBAR AND METHOD OF MAKING THE SAME

[75] Inventors: Mark A. Kaiser, Elida, Ohio; Sean P. Walsh, Carrboro; Nelson H. Douglass, Garner, both of N.C.

[73] Assignees: Reichhold Chemicals, Inc., Durham, N.C.; Marshall Industries Composites, Lima, Ohio

[21] Appl. No.: 267,772

[22] Filed: Jun. 28, 1994

[51] Int. Cl.$^6$ .................................................. B32B 5/12
[52] U.S. Cl. .................. 428/108; 428/294; 428/377; 428/408; 428/36.4; 428/36.91; 428/74; 52/309.15; 52/309.16; 52/309.17; 52/740.1
[58] Field of Search .................. 428/325, 108, 428/357, 361, 364, 369, 375, 408, 74, 76, 288, 290, 75, 294, 327, 36.4, 36.91, 373, 902, 195; 52/309.15, 309.17, 600, 737, 739, 736, 738, 309.16, 740.1, 740.4, 737.4; 57/232, 217, 220, 221, 234

[56] References Cited

U.S. PATENT DOCUMENTS

| | | | |
|---|---|---|---|
| 2,425,883 | 8/1947 | Jackson | 72/59 |
| 3,700,752 | 10/1972 | Hutchinson | 260/859 R |
| 3,721,643 | 3/1973 | Vargiu et al. | 260/40 R |
| 3,886,229 | 5/1975 | Hutchinson et al. | 260/859 R |
| 3,929,929 | 12/1975 | Kuehn | 260/859 |
| 3,959,209 | 5/1976 | Lake | 260/40 R |
| 4,062,826 | 12/1977 | Hutchinson et al. | 260/40 TN |
| 4,067,845 | 1/1978 | Epel et al. | 260/40 R |
| 4,110,120 | 8/1978 | Rosenberg et al. | 106/99 |
| 4,128,537 | 12/1978 | Markiewitz | 528/49 |
| 4,252,696 | 2/1981 | McQuarrie | 260/16 |
| 4,296,020 | 10/1981 | Magrans, Jr. | 260/37 N |
| 4,301,201 | 11/1981 | Stout | 428/36 |
| 4,394,338 | 7/1983 | Fuwa | 264/135 |
| 4,564,540 | 1/1986 | Davies et al. | 428/34 |
| 4,605,254 | 8/1986 | Carmien | 294/57 |
| 4,612,744 | 9/1986 | Shamash | 52/220 |
| 4,620,401 | 11/1986 | L'Esperance et al. | 52/309.15 |
| 4,725,491 | 2/1988 | Goldfein | 428/312.4 |
| 4,812,343 | 3/1989 | Kiekhaefer et al. | 428/35.6 |
| 4,892,764 | 1/1990 | Drain et al. | 428/34.5 |
| 4,935,279 | 6/1990 | Perko et al. | 428/74 |
| 4,958,961 | 9/1990 | Herbst et sl. | 405/260 |
| 5,015,514 | 5/1991 | Rinehart | 428/36.4 |
| 5,077,113 | 12/1991 | Kakihara et al. | 428/108 |
| 5,077,326 | 12/1991 | Shibata et al. | 523/523 |
| 5,084,222 | 1/1992 | Glemet et al. | 264/136 |
| 5,100,738 | 3/1992 | Graf | 428/613 |
| 5,120,380 | 6/1992 | Strachan | 156/164 |
| 5,127,954 | 7/1992 | Johnston et al. | 106/644 |
| 5,139,843 | 8/1992 | Murakami et al. | 428/116 |
| 5,139,845 | 8/1992 | Beckerman et al. | 428/117 |
| 5,152,945 | 10/1992 | Thicthener et al. | 264/136 |
| 5,166,230 | 11/1992 | Stecker | 523/500 |
| 5,174,844 | 12/1992 | Tong | 156/180 |
| 5,183,694 | 2/1993 | Webb | 428/67 |
| 5,200,261 | 4/1993 | Taguchi et al. | 428/245 |
| 5,211,669 | 5/1993 | Bonnes et al. | 16/110 R |
| 5,212,234 | 5/1993 | Van Gasse et al. | 525/43 |
| 5,234,333 | 8/1993 | Rhodes, Jr. et al. | 425/391 |
| 5,271,193 | 12/1993 | Olsen et al. | 52/19 |
| 5,290,407 | 3/1994 | Syrett et al. | 204/147 |

*Primary Examiner*—Merrick Dixon
*Attorney, Agent, or Firm*—Myers Bigel Sibley & Sajovec, P.A.

[57] ABSTRACT

The present invention provides a reinforcing structural rebar. The rebar comprises an inner core formed by pultruding reinforcing fibers through a bath of a first resin material, the inner core typically containing at least about 40 percent by weight reinforcing fibers and an outer cladding of a corrosion resistant and reinforced second resin material.

26 Claims, 1 Drawing Sheet

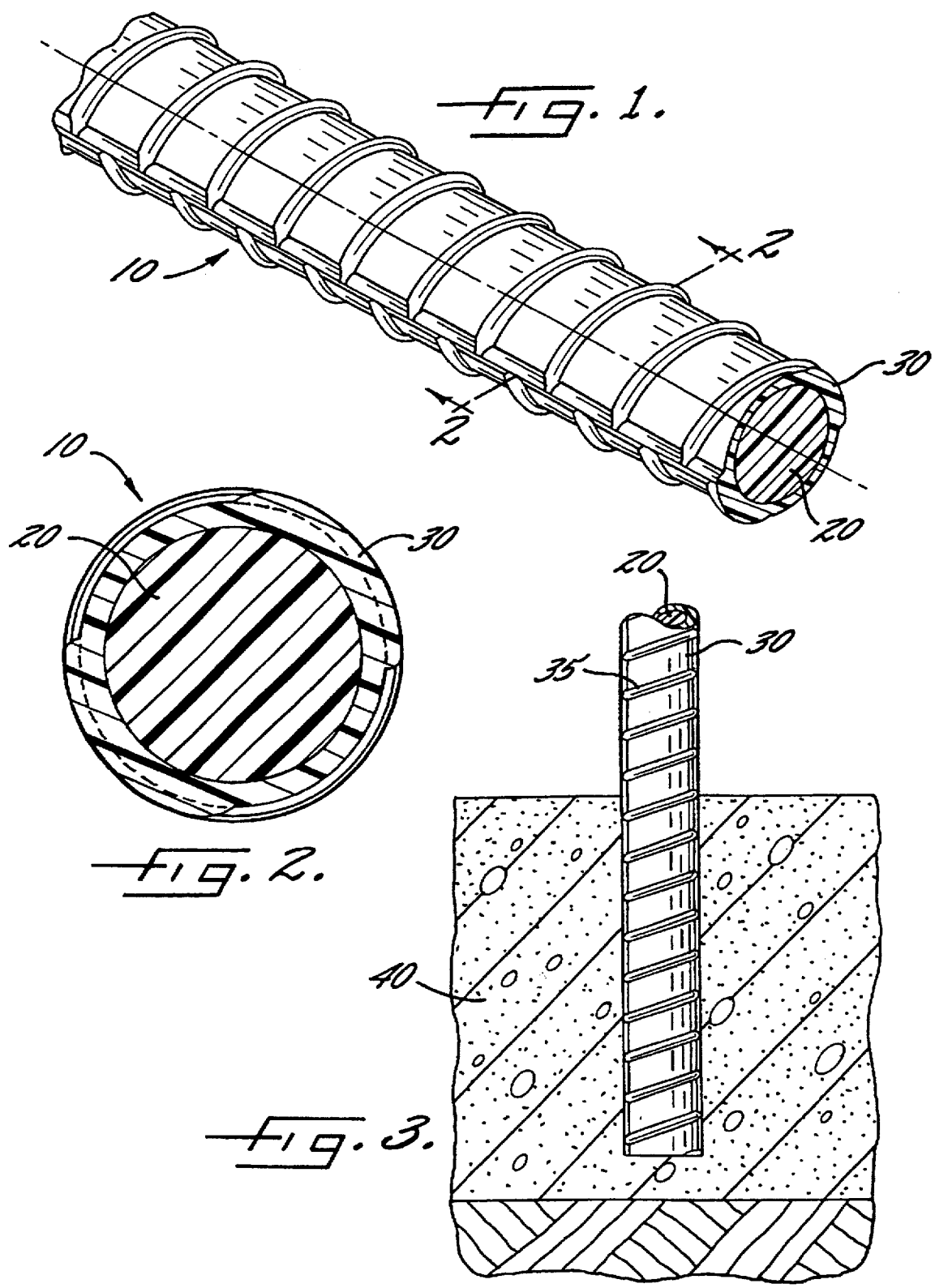

REINFORCING STRUCTURAL REBAR AND METHOD OF MAKING THE SAME

FIELD OF THE INVENTION

The invention relates to reinforcing rebar particularly adapted to reinforce cementitious materials such as concrete, and to a method of forming such reinforcing rebar.

BACKGROUND OF THE INVENTION

Concrete and other masonry or cementitious materials have compressive strength but substantially low tensile strength. Thus, when using concrete as a structural member, for example, in a building, bridge, pipe, pier, culvert, or the like, it is conventional to incorporate reinforcing members to impart the necessary tensile strength. Historically, the reinforcing members are steel or other metal reinforcing rods or bars, i.e., "rebar". Such reinforcing members may be placed under tension to form prestressed or positioned concrete structures.

Steel and other metals are, however, susceptible to oxidation. For example, ferrous metal rusts by the oxidation thereof to the corresponding oxides and hydroxides of iron by atmospheric oxygen in the presence of water. Concrete normally is poured at a pH of 12 to 14 (i.e., at high alkalinity) due to the formation of hydroxides of sodium, potassium, and calcium on the hydration of concrete. As long as the pH is maintained, the steel is passive leading to long-term stability and corrosion resistance.

Lowering the pH or exposure to a strong acid such as chlorine ions can cause the steel to be corroded. For example, chlorine ions permeating into the concrete can cause corrosion. Sources of chlorine ions include road salt, salt air in marine environments, and salt-contaminated aggregate (e.g., sand) used in making the concrete. When the reinforcement corrodes, expansion can occur, resulting in internal stresses in the concrete. This leads to cracking of the concrete which begins to disintegrate. For example, a crumbling bridge structure will be characterized by large sections of concrete crumbled away, exposing rusted steel rebar reinforcements. Moreover, the cracking and crumbling concrete causes exposure of additional steel to atmospheric oxygen, water, and sources of chlorine ions.

Such structural damage has become a major problem in a wide variety of geographical areas. For example, bridges and other concrete building infrastructures in northern United States cities are constantly in need of repair because of the salting of roadways after each winter snowstorm. Another example is the bridges leading to the Keys in Florida which are exposed to sea air. These bridges are continuously being rebuilt because of the short lifespan of the concrete. Yet another example includes buildings in Saudi Arabia and the Middle East wherein concrete is typically made using the acidic sand of the region. Thus, it is readily apparent that there is a critical need for a solution to the corrosion problem.

Various solutions to the corrosion problem of steel rebar have been offered. These solutions, however, have been largely unsuccessful for various reasons. Noncorrosive coatings on the concrete or steel rebar or both have been proposed. For example, U.S. Pat. No. 5,271,193 to Olsen et al. proposes a steel-reinforced concrete product such as a manhole cover having a coating of a corrosion resistant gel coat layer and an intermediate layer of fiberglass between the concrete and the gel coat layer. The gel coat layer is described as being a "hardenable polymeric fluid material." U.S. Pat. No. 4,725,491 to Goldfein proposes steel rebar members having chemical conversion iron oxide coatings thereon such as black iron oxide. U.S. Pat. No. 5,100,738 to Graf proposes steel rebar having a first layer of a synthetic material (e.g., epoxy resin) and a second layer of aluminum or aluminum alloy between the first layer and the steel. These exemplary coatings, in general, tend to be expensive and have had mixed results and acceptance.

There has also been interest in replacing the steel with various fiber-reinforced resins. For example, U.S. Pat. Nos. 5,077,133 to Kakihara et al. proposes a first filament bundle spirally wound around a fiber-reinforced core, a plurality of second filament bundles positioned axially along the core and a third filament bundle spirally wound around the core and the other bundles. U.S. Pat. No. 4,620,401 to L'Espérance et al. proposes a fiber reinforced thermosetting resin core and a plurality of continuous fibers helically wound around the core and impregnated with the thermosetting resin. The fiber-reinforced rods proposed therein have manufacturing limitations and are difficult to manufacture continuously and rapidly. Additionally, the winding of filaments onto a core tends to reduce the tensile strength of the core and can cause wicking problems.

Thus, there continues to be a need for a synthetic reinforcing rebar to replace steel and metal rebar without sacrificing the physical properties attributed to steel and metal rebar.

SUMMARY OF THE INVENTION

With the foregoing in mind, it is an object of the present invention to provide a structural rebar which provides tensile strength to cementitious materials such as concrete.

It is another object of the present invention to provide a structural rebar which is resistant to corrosion and thereby reduces the cracking and crumbling of the cementitious material.

These and other objects, advantages, and features of the present invention are provided by reinforcing structural reinforcing rod or bar (rebar) comprising an inner core formed by pultruding reinforcing fibers through a bath of a first resin material, the inner core typically containing at least about 40 percent by weight reinforcing fibers and an outer cladding (e.g., sheet molding compound ("SMC")) comprising a reinforced corrosion resistant second resin material. The outer cladding is preferably reinforced with at least about 0 to 65 percent by weight of the outer cladding of unidirectional fibers and at least about 65 to 0 percent by weight of the outer cladding of randomly oriented fibers.

The present invention also relates to a method of forming the reinforcing structural rebar. The method comprises the steps of impregnating reinforcing fibers by pultruding the reinforcing fibers through a bath of a first resin material; subjecting the impregnated reinforcing fibers to conditions sufficient to thicken the first resin material; and contacting the thickened first resin including impregnated reinforcing fibers with an outer layer of a reinforced corrosion resistant second resin material.

BRIEF DESCRIPTION OF THE DRAWINGS

FIG. 1 is a perspective view of a reinforcing structural rebar in accordance with the present invention.

FIG. 2 is a cross-sectional view of the reinforcing structural rebar taken substantially along line 2—2 of FIG. 1.

FIG. 3 is a cross-sectional view showing the reinforcing structural rebar embedded in concrete.

DETAILED DESCRIPTION OF THE INVENTION

The present invention will now be described more fully hereinafter. This invention may, however, be embodied in many different forms and should not be construed as limited to the embodiment set forth herein; rather, this embodiment is provided so that this disclosure will be thorough and complete, and will fully convey the scope of the invention to those skilled in the art.

As summarized above and as shown in FIGS. 1 and 2, the reinforcing structural rebar 10 of the present invention comprises an inner core 20 formed by pultruding reinforcing fibers through a bath of a first resin material, and an outer cladding 30 comprising a reinforced corrosion resistant second resin material. The outer cladding may be provided in the form of a preformed shape which can be compression molded at a later time to provide the outer cladding. The preferred outer cladding is sheet molding compound (SMC), although other reinforced resinous compounds such as bulk molding compound are contemplated. For simplicity, we will refer to the outer cladding as SMC.

The inner core 20 preferably contains at least about 40 percent by weight reinforcing fibers. Preferably, the SMC is reinforced with at least about 0 to 65 percent by weight of SMC of unidirectional fibers and at least about 65 to 0 percent by weight of SMC of randomly oriented (e.g., chopped) fibers. The outer cladding 30 may have a profile 35 (e.g., circumferential external ribs) to facilitate bonding with cementitious material 40. Additionally, the core 20 may be circumferentially wound with reinforcing fibers to provide additional strength to the core and to provide additional mechanical bonding of the core to the SMC.

Conventionally, the reinforcing fibers of the inner core are glass fibers. Glass fibers are readily available and low in cost. A typical glass fiber is electrical grade E-glass. E-glass fibers have a tensile strength of approximately 3450 MPa (practical). Higher tensile strengths can be accomplished with S-glass fibers having a tensile strength of approximately 4600 MPa (practical). The glass fiber can be treated to provide other properties such as corrosion resistance. Other suitable reinforcing fibers include carbon, metal, high modulus organic fibers (e.g., aromatic polyamides, polybenzimidazoles, and aromatic polyimides), and other organic fibers (e.g., polyethylene, liquid crystal and nylon). Blends and hybrids of the various fibers can be used.

First Resin Material

The first resin material is preferably a thermosetting resin. The term "thermosetting" as used herein refers to resins which irreversibly solidify or "set" when completely cured. Useful thermosetting resins include unsaturated polyester resins, phenolic resins, vinyl ester resins, polyurethanes, and the like, and mixtures and blends thereof. Additionally, the thermosetting resins useful in the present invention may be mixed with other thermosetting or thermoplastic resins. Exemplary other thermosetting resins include epoxies. Exemplary thermoplastic resins include polyvinylacetate, styrene-butadiene copolymers, polymethylmethacrylate, polystyrene, cellulose acetatebutyrate, saturated polyesters, urethane-extended saturated polyesters, methacrylate copolymers and the like.

Unsaturated polyester, phenolic and vinyl ester resins are the preferred thermosetting resins of the present invention. Suitable unsaturated polyester resins include practically any esterification product of a polybasic organic acid and a polyhydric alcohol, wherein either the acid or the alcohol, or both, provide the reactive ethylenic unsaturation. Typical unsaturated polyesters are those thermosetting resins made from the esterification of a polyhydric alcohol with an ethylenically unsaturated polycarboxylic acid. Examples of useful ethylenically unsaturated polycarboxylic acids include maleic acid, fumaric acid, itaconic acid, dihydromuconic acid and halo and alkyl derivatives of such acids and anhydrides, and mixtures thereof. Exemplary polyhydric alcohols include saturated polyhydric alcohols such as ethylene glycol, 1,3-propanediol, propylene glycol, 1,3-butanediol, 1,4-butanediol, 2-ethylbutane-1,4-diol, 1,5-pentanediol, 1,6-hexanediol, 1,7-heptanediol, 1,8-octanediol, 1,4-cyclohexanediol, 1,4-dimethylolcyclohexane, 2,2-diethylpropane-1,3-diol, 2,2-diethylbutane-1,3-diol, 3-methylpentane-1,4-diol, 2,2-dimethylpropane-1,3-diol, 4,5-nonanediol, diethylene glycol, triethylene glycol, dipropylene glycol, glycerol, pentaerythritol, erythritol, sorbitol, mannitol, 1,1,1-trimethylolpropane, trimethylolethane, hydrogenated bisphenol-A and the reaction products of bisphenol-A with ethylene or propylene oxide.

Unsaturated polyester resins can also be derived from the esterification of saturated polycarboxylic acid or anhydride with an unsaturated polyhydric alcohol. Exemplary saturated polycarboxylic acids include oxalic acid, malonic acid, succinic acid, methylsuccinic acid, 2,2-dimethylsuccinic acid, 2,3-dimethylsuccinic acid, hydroxylsuccinic acid, glutaric acid, 2-methylglutaric acid, 3-methylglutaric acid, 2,2-dimethylglutaric acid, 3,3-dimethylglutaric acid, 3,3-diethylglutaric acid, adipic acid, pimelic acid, suberic acid, azelaic acid, sebacic acid, phthalic acid, isophthalic acid, terephthalic acid, tetrachlorophthalic acid, tetrabromophthalic acid, tetrahydrophthalic acid, 1,2-hexahydrophthalic acid, 1,3-hexahydrophthalic acid, 1,4-hexahydrophthalic acid, 1,1-cyclobutanedicarboxylic acid and trans-1,4-cyclohexanedicarboxylic acid.

Unsaturated polyhydric alcohols which are suitable for reacting with the saturated polycarboxylic acids include ethylenic unsaturation-containing analogs of the above saturated alcohols (e.g.,2-butene-1,4-diol).

Suitable phenolic resins include practically any reaction product of a aromatic alcohol with an aldehyde. Exemplary aromatic alcohols include phenol, orthocresol, metacresol, paracresol, Bisphenol A, p-phenylphenol, p-tert-butylphenol, p-tert-amylphenol, p-tert-octylphenol and p-nonylphenol. Exemplary aldehydes include formaldehyde, acetaldehyde, propionaldehyde, phenylacetaldehyde, and benzaldehyde. Particularly preferred, are the phenolic resins prepared by the reaction of phenol with formaldehyde.

Suitable vinyl ester resins include practically any reaction product of an unsaturated polycarboxylic acid or anhydride with an epoxy resin. Exemplary acids and anhydrides include (meth)acrylic acid or anhydride, α-phenylacrylic acid, α-chloroacrylic acid, crotonic acid, mono-methyl and mono-ethyl esters of maleic acid or fumaric acid, vinyl acetic acid, cinnamic acid, and the like. Epoxy resins which are useful in the preparation of the polyvinyl ester are well known and commercially available. Exemplary epoxies include virtually any reaction product of a polyfunctional halohydrin, such as epichlorohydrin, with a phenol or polyhydric phenol. Suitable phenols or polyhydric phenols include for example, resorcinol, tetraphenol ethane, and various bisphenols such as Bisphenol-A, 4,4'-dihydroxydiphenyl-sulfone, 4,4'-dihydroxy biphenyl, 4,4'-dihydroxydiphenylmethane, 2,2'-dihydroxydiphenyloxide, and the like.

Typically, the first resin material of the present invention also includes a vinyl monomer, in which the thermosetting resin is solubilized. Suitable vinyl monomers include styrene, vinyl toluene, methyl methacrylate, p-methyl styrene, divinyl benzene, diallyl phthalate and the like. Styrene is the preferred vinyl monomer for solubilizing unsaturated polyester or vinyl ester resins.

The inner core 20 is formed by pultruding the reinforcing fibers through a resin bath. Pultrusion is an automated process for manufacturing composite materials into linear, continuous, profiles having constant cross-sections. Typically, the pultrusion process begins with reinforcing fibers which are strung from creels at the beginning of the system, to pullers at the end. The fibers typically pass through a resin bath where they are impregnated with resin. The resin impregnated fibers are continuously pulled through a die which typically has both cooling and heating zones, and which fashions the final shape of the profile. The heating zone of the die initiates and accelerates the polymerization of the resin and the profile exits as a hot, fully cured profile having a constant cross-section.

As mentioned above, the fibers may be impregnated by passing through a resin bath. This is conventionally known as a "wet-bath" pultrusion system. A second pultrusion system effects fiber impregnation by injecting resin into the fibers from a pressurized resin holding tank.

In a preferred embodiment, the thermosetting resin is thickened during the pultrusion process. The thickening can occur before, during, or after passing through the pultrusion die. The term "thickened" as used herein relates to an increase in viscosity of the resin such that the resin is transformed from a liquid to a nondripping paste form. This is often achieved by partial curing or so-called "B-staging" the resin. The term "partial curing" as used herein refers to incompletely polymerizing the resin by initiating polymerization and subsequently arresting the polymerization or controlling the polymerization so that full cure occurs at a later time. The resin being in a thickened or partially cured state, retains reactive sites, facilitates chemical bonding between the pultruded core and the outer layer of SMC.

Thickening or partial curing is achieved in a variety of ways. For example, the thermosetting resin may be thickened by the inclusion of a thickening agent. Suitable thickening agents are commonly known to those skilled in the art and include crystalline unsaturated polyesters, polyurethanes, alkali earth metal oxides and hydroxides, and polyureas. Preferably, the thickening agent cooperates with the conditions within the die to thicken or partially cure the thermosetting resin. The conditions within the die which are required to effect the thickening or partial cure of the thermosetting resin are dependent upon the thickening agent employed, and are discussed in detail below.

Suitable resins employing a crystalline polyester thickening agent are described in U.S. Pat. No. 3,959,209 to Lake, the disclosure of which is incorporated herein by reference in its entirety. Typically, in the embodiment of the invention wherein the thermosetting resin is thickened with a crystalline polyester, the thermosetting resin comprises a thermosetting resin solubilized in a vinyl monomer. The crystalline polyesters useful in the present invention are generally ethylenically unsaturated, and react with the vinyl monomer, although one skilled in the art will appreciate that saturated crystalline polyesters may also be employed.

Methods of preparing crystalline polyester are well known in the art and include polyesterifying a symmetrical, aliphatic diol with fumaric acid, lower alkyl esters of fumaric acid, or symmetrical saturated diacids such as terephthalic acid, isophthalic acid and sebacic acid. Maleic anhydride or maleic acid or lower alkyl esters of maleic acid may also be used in the presence of an appropriate catalyst. Likewise, mixtures of fumaric acid or esters with maleic anhydride or maleic acid or its esters may also be used. Exemplary crystalline polyesters which may be employed in the present invention include polyfumarates of 1,6-hexanediol, neopentyl glycol, bis-(hydroxyethyl) resorcinol, ethylene glycol, 1,4-butanediol, 1,4-cyclohexanediol, 1,4-cyclohexanedimethanol, or bis-(hydroxyethyl) hydroquinone.

The amount of crystalline polyester added to the thermosetting resin will vary depending upon the particular thermosetting resin employed. Typically, about 2 to about 80 percent by weight of crystalline polyester is required to thicken about 20 to about 98 percent by weight of a thermosetting resin. In the embodiment of the invention wherein the first resin material including a crystalline polyester thickening agent is thickened within the die, the conditions within the die which are sufficient to thicken the first resin material typically comprise heat sufficient to thicken the first resin material. Typically, sufficient heat is provided by operating the die under conditions which include heating at least one zone of the die. In one preferred embodiment, the conditions within the die include maintaining the entry zone at a temperature of from about 25° to about 85° C., heating the center zone to a temperature of from about 35° to about 120° C., and maintaining the exit zone at a temperature of from about 0° to about 90° C.

The thermosetting resin of the present invention may also be thickened with polyurethanes. Exemplary thermosetting resin thickened with a polyurethane are described in U.S. Pat. No. 3,886,229 to Hutchinson, the disclosure of which is incorporated herein by reference in its entirety. Typically, in the embodiment of the invention wherein the thermosetting resin is thickened with a polyurethane, the first resin material comprises a thermosetting resin solubilized in a vinyl monomer.

The polyurethanes useful in the present invention typically comprise the reaction product of a polyol and an isocyanate compound. The polyol may be saturated or unsaturated. Exemplary saturated polyols include ethylene glycol, propylene glycol, butane-1,4-diol, pentane-1,5-diol, hexane-1,6-diol, di(ethylene glycol), and di(propylene glycol). Polymers of glycols may also be employed. Exemplary polymers include poly(ethylene glycol), poly (propylene glycol), and poly(butylene glycol) and polyols of functionality greater than two, for example, glycerol, pentaerythritol, and trialkylol alkanes, e.g., trimethylol propane, triethylol propane, tributylol propane and oxyalkylated derivatives of said trialkylol alkanes, e.g., oxyethylated trimethylol propane and oxypropylated trimethylol propane.

In the embodiment wherein the thermosetting resin is thickened with a polyurethane including an unsaturated polyol, the unsaturated polyol crosslinks the urethane groups with the ethylenically unsaturated polyester and vinyl monomer of the thermosetting resin. Exemplary unsaturated polyols include polyesters, and vinyl esters. In one particularly preferred embodiment, the unsaturated polyol is a diester of propoxylated bisphenol-A.

The isocyanate compound is typically a polyisocyanate. The polyisocyanate may be aliphatic, cycloaliphatic or aromatic or may contain in the same polyisocyanate molecule aliphatic and aromatic isocyanate groups, aliphatic and cycloaliphatic isocyanate groups, aliphatic cycloaliphatic and aromatic isocyanate groups or mixtures of any two or more polyisocyanates.

Exemplary polyisocyanates include 4,4'-diphenylmethane diisocyanate, 2,4-toluene diisocyanate, 2,6-toluene diisocyanate, isophorone diisocyanates (e.g., 3-isocyanatomethyl-3,5,5-trimethylcyclohexyl isocyanate), tetramethylene diisocyanate, pentamethylene diisocyanate, hexamethylene diisocyanate and octamethylene diisocyanate, and cycloaliphatic diisocyanates (e.g., 4,4'-dicyclohexylmethane diisocyanate).

The polyurethane may be reacted with the thermosetting resin according to any method known to those skilled in the art. The amount of polyurethane added to the first resin material will vary depending upon the particular thermosetting resin employed. Typically, the polyurethane comprises about 1 to about 60 percent by weight of the thermosetting resin.

The conditions in the die which are sufficient to thicken the first resin material including a polyurethane thickening agent typically comprise subjecting the first resin material to sufficient heat to thicken the first resin material. Typically, sufficient heat is provided by operating the die under conditions which include heating at least one zone of the die. In one preferred embodiment, the conditions within the die include maintaining the entry zone at a temperature of from about 10° to about 35° C., heating the center zone to a temperature of from about 30° to about 200° C., and maintaining the exit zone at a temperature of from about 0° to about 200° C.

The first resin material may also be thickened using a polyurea thickening agent. Suitable formulation of resins thickened with polyurea are described in U.S. Pat. No. 4,296,020 to Magrans, Jr., the disclosure of which is incorporated herein by reference in its entirety. Typically, in the embodiment of the invention wherein the first resin material is thickened with polyurea, the first resin material comprises a resin solubilized in a vinyl monomer. The polyureas useful in the present invention comprise the product of polyamines with polyisocyanates. The polyisocyanates useful in the present invention include those described above with reference to urethane thickeners. Aliphatic, cycloaliphatic and aromatic polyamines free of ethylenic saturation are preferred polyurea precursors in that they form individual polyurea chains which are relatively cross-linked with the polymer chain formed by the copolymerization of the ethylenically unsaturated resin and monomers in solution therewith.

Aryl diamines and mixtures thereof such as metaphenylene diamine, paraphenylene diamine, naphthalene diamine, benzidene, bis(4-amino-phenyl) methane, 4,4'-diaminodiphenyl sulfone and halogenated derivatives such as those containing halogen on the benzenoid ring such as 3,3'-dichlorobenzidine, bis,4-amino-2-chlorophenyl (sulfone), 4-bromo-1,3-phenylene diamine, to name a few, are operable.

Low molecular weight aliphatic and cycloaliphatic diamines are also suitably employed, such as: ethylene diamine, propylene diamine, hexamethylene diamine, trimethyl hexamethylene diamine, isophorone diamine, 1-amino-3-amino-3,5,5-trimethyl cyclohexane, hydrogenated di-(aminophenyl) methane, hydrogenated methylene dianiline, diamino methane, and hydrogenated toluene diamine. The most useful of these are those that are liquids up to 75° C. For those which are solids under these conditions, vinyl monomer solutions can be employed to form the homogeneous mix rapidly. In addition, other suitable amines include polyoxyalklene polyamines and cyanoalkylated polyoxyalklene polyamines having a molecular weight of about 190 to about 2,000 with a preferred range of about 190 to about 1,000. These amines are prepared according to the procedure outlined in a U.S. Pat. No. 4,296,020 to Magrans, Jr., the disclosure of which is hereby incorporated by reference in its entirety.

The conditions in the die which are sufficient to thicken the first resin material including a polyurea thickening agent typically comprise subjecting the first resin material to sufficient heat to thicken the first resin material. Typically, sufficient heat is provided by operating the die under conditions which include heating at least one zone of the die. In one preferred embodiment, the conditions within the die include maintaining the entry zone at a temperature of from about 10° to about 35° C., heating the center zone to a temperature of from about 30° to about 200° C., and maintaining the exit zone at a temperature of from about 0° to about 200° C.

The first resin material may also be thickened using alkali earth metal oxides or hydroxides. Typical thickeners of this type include calcium and magnesium oxides or hydroxides. The addition of these components to the first resin material will transform the liquid thermosetting resin to a semi-solid or solid form. The amount of oxide or hydroxide employed will vary depending upon the particular thermosetting resin employed. Typically, the alkali metal oxide or hydroxide comprises about 1 to about 15 percent by weight of the first resin material.

In the embodiment wherein the first resin material including an alkali metal oxide or hydroxide thickening agent is thickened within the die, the conditions in the die which are sufficient to thicken the first resin material typically comprise subjecting the first resin material to heat sufficient to thicken the first resin material. Typically, sufficient heat is provided by operating the die under conditions which include heating at least one zone of the die. In one preferred embodiment, the conditions within the die include maintaining the entry zone at a temperature of from about 10° to about 35° C., heating the center zone to a temperature of from about 30° to about 130° C., and maintaining the exit zone at a temperature of from about 0° to about 80° C.

The first resin material also may include an initiator system which cooperates with the conditions of the die to thicken the first resin material by partially curing the first resin material. The initiator system may be present in addition to any of the foregoing thickening agents, or as an alternative thereto.

The initiator system may comprise any number of polymerization initiators. Where multiple polymerization initiators are employed, the initiator system typically comprises polymerization initiators which can be activated by different conditions. For simplicity, where multiple polymerization initiators are employed, we refer to the polymerization initiator requiring the least activation energy as the "first polymerization initiator", and the initiator requiring the most activation energy as the "second polymerization initiator". Any practical number of polymerization initiators having activation energies between the first and second polymerization initiators may also be incorporated into the thermosetting resin matrix. It should not be implied from our use of the terms "first" and "second" polymerization initiator that we restrict our invention to the use of no more than two polymerization initiators.

Polymerization initiators which are useful in the practice of the present invention typically include free-radical initiators. Typical free-radical initiators include peroxy initiators. The reactivity of such initiators is evaluated in terms of the 10 hour half-life temperature, that is, the temperature at which the half-life of a peroxide is 10 hours. Suitable first polymerization initiators include polymerization initiators having a low 10 hour half-life, i.e., a more reactive peroxide initiator, as compared to initiators having a higher 10 hour half-life. Suitable second polymerization initiators include polymerization initiators having a higher 10 hour half-life than the 10 hour half-life of the polymerization initiator selected as the first polymerization initiator. Exemplary free-radical initiators useful in the present invention include diacyl peroxides, (e.g., lauroyl peroxide and benzoyl peroxide), dialkylperoxydicarbonates, (e.g., di(4-tert-butylcyclohexyl) peroxy dicarbonate), tert-alkyl peroxyesters, (e.g., t-butyl perbenzoate), di-(tert-alkyl) peroxyketals, (e.g., 1,1-di-(t-amylperoxy) cyclohexane), di-tert-alkyl peroxides, (e.g., dicumyl peroxide), azo initiators, (e.g., 2,2'-azobis(isobutyronitrile), ketone peroxides, (e.g., methylethylketone peroxide and hydroperoxides).

In the embodiment wherein the initiator system comprises only one polymerization initiator, the first resin material preferably includes a vinyl monomer. The vinyl monomer and the polymerization initiator may be independently activated under different conditions thus permitting the partial polymerization of the first resin material.

The amount of polymerization initiator(s) used is dependent upon the number of initiators employed, the conditions at which the selected initiators will initiate polymerization, and the time desired for partial curing. Typically the amount of time desired for partial curing is a short period, i.e., less than 3 hours, and often less than 1 hour. In the embodiment wherein the first resin material includes only one polymerization initiator, the amount of the initiator is typically about 0.1 to about 10 percent by weight of the first resin material. In the embodiment wherein the first resin material includes two polymerization initiators, the amount used is about 0.01 to about 4 percent by weight of the first polymerization initiator and about 0 to about 5 percent by weight of the second polymerization initiator based on the weight of the first resin material.

The initiator system and amounts of each polymerization initiator incorporated into the first resin material should be such that as the resin impregnated reinforcing fiber is pultruded through the die, the conditions therein are sufficient to activate at least one, but preferably not all polymerization initiators, resulting in the partial polymerization of the first resin material. Typically, in the embodiment wherein the initiator system comprises only one polymerization initiator, the resin impregnated reinforcing fiber is pultruded through a die within which the reinforcing fiber is subjected to sufficient heat to activate the polymerization initiator without attaining the self-polymerization temperature of the first resin material. In the embodiment wherein multiple polymerization initiators are employed, typically the resin impregnated reinforcing fiber is pultruded through a die within which the reinforcing fiber is subjected to sufficient heat to activate at least one, and preferably the first, polymerization initiator to partially cure the first resin material.

The conditions in the die which are sufficient to activate at least one polymerization initiator to partially cure the thermosetting resin will depend on the particular polymerization initiator(s) and the thermosetting resin selected, and will be readily determinable by one skilled in the art. Typically, the conditions within the die which are required for the activation of at least one polymerization initiator comprise subjecting the first resin material to sufficient heat to activate the most reactive, e.g., the first polymerization initiator to partially cure the first resin material. As the exits the exit zone and is cooled, the polymerization initiated by the activation of the first polymerization initiator is arrested, providing the partially cured prepreg rather than a fully cured article.

Another method of thickening the first resin material comprises subjecting the first resin material to sufficient radiation to thicken the first resin material. Exemplary forms of radiation include ultraviolet, infrared, radiofrequency waves, microwaves, and electron beams. According to this method, the resin impregnated reinforcing fiber is pultruded through a die within which the resin impregnated reinforcing fiber is subjected to radiation. The wavelength of radiation which is sufficient to thicken the first resin material is dependent upon the form of radiation and the particular thermosetting resin employed, and is readily determinable by one skilled in the art. For example, a first resin material comprising an unsaturated polyester resin or vinyl ester resin solubilized in styrene may be thickened using ultraviolet light having a wavelength ranging from about 200 to about 600 nm.

The conditions within the die which are sufficient to thicken the first resin material typically comprise subjecting the resin impregnated reinforcing fiber to radiation of a sufficient wavelength to thicken the first resin material. Preferably, the radiation source is located at the center zone of the die so that as the resin impregnated reinforcing fiber is passed through the center zone, it is irradiated. In one embodiment, typically the entry zone of the die is maintained at a temperature of from about 10° to about 200° C., the center zone is equipped with a source of radiation operating at a predetermined wavelength, and the exit zone is maintained at a temperature of from about 10° to about 200° C. Alternatively, the radiation source may be located at either the entry or exit zone of the die.

The first resin material may be thickened using only one of the foregoing methods or by using two or more methods in combination. Any combination of the foregoing thickening methods may be used to prepare the inner core. In embodiments wherein multiple methods of thickening the first resin material are employed, the conditions within the die which are sufficient to thicken the first resin material will depend on the particular combination of thickening methods employed. The necessary conditions within the die which will effect thickening will be readily determinable by one skilled in the art.

Second Resin Material

The corrosion resistant second resin material of the outer cladding is typically a thermosetting resin, and generally includes unsaturated polyester resins, vinyl ester resins, vinyl urethane resins, vinyl isocyanurate resins and the like and mixtures or blends thereof. The outer cladding (SMC) is reinforced with reinforcing fibers such as those previously described. In one embodiment, the SMC is reinforced with at least about 0 to 65 percent by weight of the SMC of unidirectional fibers and at least about 65 to 0 percent by weight of the SMC of randomly oriented (e.g., chopped) fibers. In another embodiment, the SMC is reinforced with veil. The term "veil" as used herein refers to a fibrous sheet including elongated randomly oriented single filament which can be wound onto itself to provide a sheet typically not more than 100 mils in thickness. Combinations of unidirectional fibers, randomly oriented fibers, and veil is also contemplated.

Suitable unsaturated polyester and vinyl esters include those previously described. A particularly preferred thermosetting resin is a vinyl maleate urethane modified with a polyol.

The vinyl urethane resins which are useful include those described in U.S. Pat. No. 3,929,929 to Kuehn, the disclosure of which is incorporated herein by reference in its entirety. The vinyl urethanes proposed in Kuehn are prepared by reacting a diol, a polyisocyanate, and a hydroxyl-terminated ester of acrylic or methacrylic acid. Exemplary vinyl urethanes include DION™ 31038-00 resin and ATLAC™ 580-05 resin, both of which are available from Reichhold Chemicals, Inc., Research Triangle Park, N.C.

The vinyl isocyanurate resins which are useful in the present invention include those proposed in U.S. Pat. No. 4,128,537 to Markiewitz, the disclosure of which is incorporated herein by reference. The ethylenically unsaturated isocyanurates proposed in Markiewitz are prepared by reacting a polyisocyanate with a monohydric alcohol to form a urethane, and then trimerizing the urethane to form an ethylenically unsaturated isocyanurate. An exemplary vinyl isocyanurate includes ATLAC™ 31631-00 resin available from Reichhold Chemicals, Inc., Research Triangle Park, N.C.

The SMC of the present invention may also include other additives commonly employed in SMC compositions, the selection of which will be within the skill of one in the art. For example, the second resin material may include reinforcing fillers, particulate fillers, selective reinforcements, thickeners, initiators, mold release agents, catalysts, pigments, flame retardants, and the like, in amounts commonly known to those skilled in the art. The particulate fillers typically include calcium carbonate, hydrated alumina and clay.

A variety of suitable thickeners are known to those skilled in the art and include alkali earth metal oxides or hydroxides, crystalline polyesters, polyurethanes, and polyureas. The thickener should increase the viscosity to a sufficient degree that the liquid resin is transformed to a nondripping, paste form. Polyurethanes are the preferred thickeners. U.S. Pat. No. 4,062,826 to Hutchinson et al., the disclosure of which is incorporated herein by reference in its entirety, proposes a polyurethane thickened polyester resin useful in the practice of the present invention.

The initiator may be a high or a low temperature polymerization initiator, or in certain applications, both may be employed. Suitable mold release agents include zinc stearate, calcium stearate and stearic acid. Catalysts are typically required in SMC compositions thickened with polyurethane. The catalyst promotes the polymerization of NCO groups with OH groups. Suitable catalysts include dibutyl tin dilaurate and stannous octoate. Other commonly known additives which may desirably be incorporated into the SMC composition include pigments, and flame retardants.

In operation, the structural rebar is formed by using an apparatus such as described in commonly assigned U.S. application Ser. No. 08/267,565 filed concurrently herewith, the disclosure of which is incorporated herein by reference in its entirety. The method includes impregnating the reinforcing fibers by pultruding the fibers through a bath of the first resin material. The impregnated fibers are subjected to conditions sufficient to thicken the first resin material, which typically occurs in the shaping die of the pultrusion apparatus. Optionally, the core may be circumferentially wound with reinforcing fibers. The thickened (e.g., partially cured or B-staged) resin is contacted with a layer of SMC. Preferably, after the contacting, the SMC is molded to provide a profile 35. The profile may be selected from a variety of deformation patterns, such as for example, circumferential external ribs. The mold may include a mold release layer (not shown) that can become part of the rebar or can be pealed off. This layer is typically a film and suitable film comprise polyethylene, polypropylene, or nylon, although other materials may be employed. Full cure of the resins is then completed by heating to a temperature of 80° to 250° C.

As shown in FIG. 3, the resulting structural reinforcing rebar is particularly adapted for reinforcing a mass 40 of cementitious material such as concrete. Concrete is a conglomerate of gravel, pebbles, sand, broken stone, and the like (i.e., the "aggregate") embedded in a matrix of either mortar or cement such as Portland cement. Portland cement is a type of hydraulic cement in the form of finely divided powder composed of lime, alumina, silica, and iron oxide. Exemplary reinforced structures include buildings, piers, bridges, culverts, pipes, and the like.

EXAMPLE 1

Preparation of Inner Core

A conventional wet-bath pultrusion apparatus having a 0.5 inch die opening is equipped with roving strung between guides, through the resin bath, through the die, and secured to the pulling mechanism. The resin bath is charged with 100 parts DION™ 31022-00, 0.1 parts di-(4-tert-butylcyclohexyl) peroxy dicarbonate, 0.1 parts styrene monomer, 1.0 part t-butylperbenzoate, 3.5 parts zinc stearate internal mold release agent and 50 parts calcium carbonate filler. The entry zone of the die is chilled using cooling water, while the center zone is heated to 280° F., and the exit zone was heated to 300° F.

EXAMPLE 2

Preparation of Inner Core

A conventional wet-bath pultrusion apparatus having a 0.5 inch die opening is equipped with 30 roving strung between guides, through the resin bath, through the die, and secured to the pulling mechanism. The resin bath is charged with 100 parts polyethylene terephthalate, 10 parts calcium carbonate filler, 1 part AXEL™ mold release agent, 0.75 parts PERCADOX™ 16, polymerization initiator, and 0.5 parts ESPEROX™ 570P polymerization initiator. The entry zone of the die is chilled to about 70° F. using cooling water. The center and exit zones of the die are heated to 184° F. The roving is pultruded at a rate of about 29 in/min to produce a partially cured inner core rod.

EXAMPLE 3

Preparation of Inner Core

A conventional wet-bath pultrusion apparatus having a 0.5 inch die opening is equipped with 30 roving strung between guides, through the resin bath, through the die, and secured to the pulling mechanism. The resin bath is charged with 100 parts polyethylene terephthalate, 10 parts calcium carbonate filler, 1 part AXEL™ mold release agent, 0.75 parts PERCADOX™ 16, polymerization initiator, 0.5 parts ESPEROX™ 570P polymerization initiator, and 0.5 parts t-butylper-benzoate polymerization initiator. The entry zone of the die is chilled to about 70° F. using cooling water. The center and exit zones of the die are heated to 184° F. The roving is pultruded at a rate of 40 in/min to produce a partially cured inner core rod.

13

EXAMPLE 4

Preparation of Sheet Molding Compound

A conventional sheet molding compound apparatus is equipped with an aluminum die spaced with gaps of 5 mil, 32 mil, 37 mil, and 39 mil. The sheet molding compound is prepared using ATLAC™ 580-05 resin, one inch fibers, and a 20 mil NICO™ mat type "C" Glass veil at the surface.

EXAMPLE 5

Preparation of Sheet Molding Compound

A conventional sheet molding compound apparatus is equipped with an aluminum die spaced with gaps of 5 mil, 32 mil, 37 mil, and 39 mil. The sheet molding compound is prepared using ATLAC™ 580-05 resin, one inch fibers, and a REMAY™ veil at the surface.

EXAMPLE 6

Testing of Sheet Molding Compound

The SMC of Example 5 was compressed at various pressures to analyze optimal pressures for cladding. The SMC was preformed into a semicylindrical shape and wrapped around the pultruded core. The first sample was compressed at a temperature of about 300° F. at 1000 psi for 2 min. The product exhibited 80 percent fill of the deformities. The second sample was pultruded at the same temperature but at 500 psi. The resulting product exhibited complete closure around the core, but incomplete fill of the deformities. The third sample was compressed at the same temperature and 500 psi for 2 min. The product exhibited 80 percent fill of the deformities with complete closure of the SMC around the core. The fourth sample was compressed at the same temperature and 1500 psi for 2 min. The fifth sample was compressed at the same temperature and 400 psi for 2 min. The product exhibited good fill of the deformities. The sixth sample was compressed at the same temperature and 400 psi for one min. The product exhibited good fill of the deformities. The seventh sample was compressed at the same temperature and 267 psi for 2 min. The mold surface was lined with four 1 mil thicknesses of nylon film. The resin punched through the nylon film. The eighth sample was compressed at the same temperature and 267 psi for 2 min. The mold surface was lined with five 1 mil thicknesses of nylon film, and again the resin punched through the nylon film.

The foregoing examples are illustrative of the present invention, and are not to be construed as limiting thereof. The invention is defined by the following claims, with equivalents of the claims to be included therein.

That which is claimed is:

1. A reinforcing structural rebar comprising:
    an inner core formed by pultruding reinforcing fibers through a bath of a first resin material, the inner core containing at least about 40 percent by weight reinforcing fibers and
    an outer cladding of a corrosion resistant second resin material reinforced with between about 0 to about 65 percent unidirectional fibers and between about 65 to about 0 percent randomly oriented fibers.

2. The reinforcing structural rebar of claim 1, wherein the first resin material is an unsaturated polyester or vinyl ester resin.

3. The reinforcing structural rebar of claim 1, wherein the reinforcing fibers, unidirectional fibers or randomly oriented fibers are selected from the group consisting of fibers of glass, carbon, metal, aromatic polyamides, polybenzimidazoles, aromatic polyimides, polyethylene, nylon, and blends and hybrids thereof.

4. The reinforcing structural rebar of claim 1, wherein the corrosion resistant second resin material is a vinyl ester modified urethane resin.

5. The reinforcing structural rebar of claim 4, wherein the vinyl ester modified polyurethane is vinyl maleate urethane.

6. The reinforcing structure rebar of claim 1, wherein the first resin material includes a thickening agent.

7. The reinforcing structural rebar of claim 1, wherein the outer cladding has a profile.

8. A reinforcing structural rebar comprising:
    an inner core formed by pultruding reinforcing fibers of a first reinforcing material through a bath of a first resin material, and
    an outer cladding comprising a corrosion resistant second resin material reinforced with a second reinforcing material, said outer cladding layer having an outer surface which includes a profile comprising one of projections from said outer surface or recesses within said outer surface, wherein said profile is reinforced with said second reinforcing material.

9. The reinforcing structural rebar of claim 8, wherein the first resin material is an unsaturated polyester or vinyl ester resin.

10. The reinforcing structural rebar of claim 8, wherein the reinforcing fibers, unidirectional fibers or randomly oriented fibers are selected from the group consisting of fibers of glass, carbon, metal, aromatic polyamides, polybenzimidazoles, aromatic polyimides, polyethylene, nylon, and blends and hybrids thereof.

11. The reinforcing structural rebar of claim 8, wherein the corrosion resistant second resin material is a vinyl ester modified urethane resin.

12. The reinforcing structural rebar of claim 11, wherein the vinyl ester modified polyurethane is vinyl maleate urethane.

13. The reinforcing structural rebar of claim 8, wherein the outer cladding is reinforced with unidirectional fibers or randomly oriented fibers or both, wherein the fibers are selected from the group consisting of fibers of glass, carbon, metal, aromatic polyamides, polybenzimidazoles, aromatic polyimides, polyethylene, nylon, and blends and hybrids thereof.

14. The reinforcing structure rebar of claim 8, wherein the first resin material includes a thickening agent.

15. The reinforcing structural rebar of claim 8, wherein the corrosion resistant and reinforced second resin material is reinforced with veil.

16. The reinforcing structural rebar of claim 8, wherein the outer cladding is sheet molding compound.

17. A reinforced structure of cementitious material comprising:
    a mass of cementitious material; and
    one or more reinforcing structural rebar embedded in the mass of cementitious material, the reinforcing structural rebar comprising an inner core formed by pultruding reinforcing fibers of a first reinforcing material through a bath of a first resin material, and an outer cladding comprising a corrosion resistant second resin material reinforced with a second reinforcing material, said outer cladding layer having an outer surface which includes a profile comprising one of projections from said outer surface or recesses within said outer surface, wherein said profile is reinforced with said second reinforcing material.

18. The reinforced structure of claim 17, wherein the first resin material is an unsaturated polyester or vinyl ester resin.

19. The reinforced structure of claim 17, wherein the cementitious material is Portland cement.

20. The reinforced structure of claim 17, wherein the reinforcing fibers, unidirectional fibers or randomly oriented fibers are selected from the group consisting of fibers of glass, carbon, metal, aromatic polyamides, polybenzimidazoles, aromatic polyimides, polyethylene, nylon, and blends and hybrids thereof.

21. The reinforced structure of claim 17, wherein the corrosion resistant and reinforced second resin material is a vinyl ester modified urethane resin.

22. The reinforced structure of claim 21, wherein the vinyl ester modified polyurethane is vinyl maleate urethane.

23. The reinforced structure of claim 17, wherein the outer cladding of sheet molding compound includes unidirectional fibers or randomly oriented fibers or both selected from the group consisting of fibers of glass, carbon, metal, aromatic polyamides, polybenzimidazoles, aromatic polyimides, polyethylene, nylon, and blends and hybrids thereof.

24. The reinforced structure of claim 17, wherein the first resin material includes a thickening agent.

25. The reinforced structure of claim 17, wherein the corrosion resistant and reinforced second resin material is reinforced with veil.

26. A reinforced structure of cementitious material comprising:

a mass of cementitious material; and one or more reinforcing structural rebar embedded in the mass of cementitious material, the reinforcing structural rebar comprising an inner core formed by pultruding reinforcing fibers through a bath of a first resin material, the inner core containing at least 40 percent by weight reinforcing fibers and an outer cladding of a corrosion resistant second resin material reinforced with between about 0 to about 65 percent unidirectional fibers and between about 65 to about 0 percent randomly oriented fibers.

* * * * *